UNITED STATES PATENT OFFICE.

RUDOLPH LINKMEYER, OF BRUSSELS, BELGIUM.

METHOD OF MANUFACTURING CELLULOSE STRUCTURES.

962,769.

No Drawing.

Specification of Letters Patent. Patented June 28, 1910.

Application filed August 26, 1908. Serial No. 450,395.

*To all whom it may concern:*

Be it known that I, RUDOLPH LINKMEYER, a subject of the German Emperor, and residing at Brussels, Belgium, have invented a certain new and useful Improved Method of Manufacturing Cellulose Structures, of which the following is a specification.

The present invention relates to methods of manufacturing cellulose structures by means of cupric oxid ammonia solutions, and an important object is to provide a method which is both cheaper and safer to workers than those known heretofore.

As is known, filament structures which shine like silk can be precipitated directly from solutions of cellulose in cupric oxid ammonia by allowing the solutions to enter through capillary tubes into caustic alkali lyes. Concentrated and heated soda lye has generally been employed heretofore because diluted lye acts too slowly, and, in the event of its containing less than 5% caustic alkali, it does not even provide slightly durable structures, for example shining filaments, which can be used in practice. Further, solutions of salts which react neutral or alkaline, such as sodium chlorid or sodium carbonate, have been used heretofore as the coagulating agent when manufacturing filaments of cupric oxid cellulose ammonia solutions. But these also have only a slow precipitating action and therefore cannot be used under special conditions.

Now it has been found that the coagulation of the cellulose dissolved in cupric oxid ammonia can take place in alkaline or earth-alkaline chlorid solutions when the latter have added to them sodium hydroxid or potassium hydroxid for increasing the power of coagulation. It has been observed that a relatively small addition of these alkalies to the chlorid salts lends a considerable power of coagulation. In addition it has been observed that the structures coagulated in this manner, for example fine filaments, have the same properties as those which have been coagulated in pure soda lye. The filaments coagulated with alkaline chlorin salts are glass-like, transparent, elastic and firm immediately after their precipitation.

The method or process according to the invention therefore consists substantially in dissolving cellulose in cupric oxid ammonia, and in forming these solutions into optional shapes, and in then coagulating them in alkaline chlorid baths which have caustic alkalies added to them.

The invention may be carried into practice as follows:—About 28 kilograms of sodium chlorid are dissolved in 100 liters of water, and 3 to 5 more kilograms of sodium oxid hydrate are added to the solution thus obtained. The whole mixture thus obtained is boiled and is preferably used while it is still hot.

Besides the above described method, the required sodium oxid hydrate can also be made by soda and caustic lye being added to the salt solution, or also electrically directly from the sodium chlorid by a part of the dissolved sodium chlorid being split up by the action of an electric current into chlorin and sodium hydrate, and the former being removed from the sodium chlorid solution.

It will be readily understood that the new method or process has a higher practical value as compared with those in which pure soda lye is employed as the precipitating liquid, since the manufacturing costs are considerably diminished owing to alkaline chlorids being employed which have a very small commercial value.

A further advantage of the new method is that owing to working in alkaline salt solutions, the manufacture is also much easier, for manipulations in concentrated soda lyes are dangerous for the workers and attack their hands to a very serious extent.

What I claim as my invention and desire to secure by Letters Patent is:—

1. Method of manufacturing cellulose structures consisting in dissolving cellulose in cupric oxid ammonia, in forming the solution thus obtained into shapes corresponding to the purpose in each instance, and in coagulating the bodies thus obtained in alkaline chlorid baths containing relatively small quantities of caustic alkalies.

2. Method of manufacturing cellulose structures, consisting in dissolving cellulose in cupric oxid ammonia, in forming the solution thus obtained into shapes, and in coagulating said formed shapes in a solution comprising 100 liters of water, about 28 kilograms of sodium chlorid and about 5 kilograms of caustic alkali.

3. The method of manufacturing cellulose structures which consists in forming a cupro-ammonium cellulose solution, producing suitable shapes therefrom, and coagulating the shapes thus produced in a solution of an alkaline metal chlorid containing caustic alkali.

4. The method of manufacturing cellulose structures, which consists in forming a cupro-ammonium cellulose solution, producing suitable shapes therefrom and coagulating the shapes thus produced in a solution of a chlorid of a metal of the alkalies containing caustic alkali.

In testimony whereof, I affix my signature in the presence of two witnesses.

RUDOLPH LINKMEYER.

Witnesses:
GREGORY PHELAN,
ETHELBERT WATTS.